United States Patent [19]

Baxter

[11] Patent Number: 4,991,981

[45] Date of Patent: Feb. 12, 1991

[54] BALL BEARING RETAINER FOR DRAWER SLIDES

[75] Inventor: Alan R. Baxter, Waterloo, Canada

[73] Assignee: Waterloo Metal Stampings Ltd., Waterloo, Canada

[21] Appl. No.: 522,737

[22] Filed: May 14, 1990

[30] Foreign Application Priority Data

Jul. 7, 1989 [CA] CANADA .................................. 605041

[51] Int. Cl.⁵ .............................................. F16C 29/04
[52] U.S. Cl. .......................................... 384/18; 384/49
[58] Field of Search ................... 384/18, 49, 523, 533, 384/614; 312/341.1

[56] References Cited

U.S. PATENT DOCUMENTS

| | | | |
|---|---|---|---|
| 3,205,025 | 9/1965 | Jordan | 384/18 |
| 3,488,097 | 1/1970 | Fall | 384/18 |
| 4,112,539 | 9/1978 | Hager | 384/18 X |
| 4,470,643 | 9/1984 | Schaefer et al. | 384/49 |

Primary Examiner—Thomas R. Hannon
Attorney, Agent, or Firm—Hill, Van Santen, Steadman & Simpson

[57] ABSTRACT

A unique ball-bearing retainer is disclosed for use with two or three part drawer slides for filing cabinets and the like. The retainer uses a standard channel member with upturned side flanges. The flanges are equipped with round apertures and then bent at the approximate mid-point thereby creating an elliptical aperture providing a seat for rotation of a common steel ball. The ball comes in contact with the aperture at the base and the top of the same such that during operation of the drawer slide the portions of the ball having maximum rotation or movement do not contact the retainer thereby reducing friction, and increasing the life of the drawer slide.

4 Claims, 2 Drawing Sheets

U.S. Patent  Feb. 12, 1991  Sheet 1 of 2  4,991,981
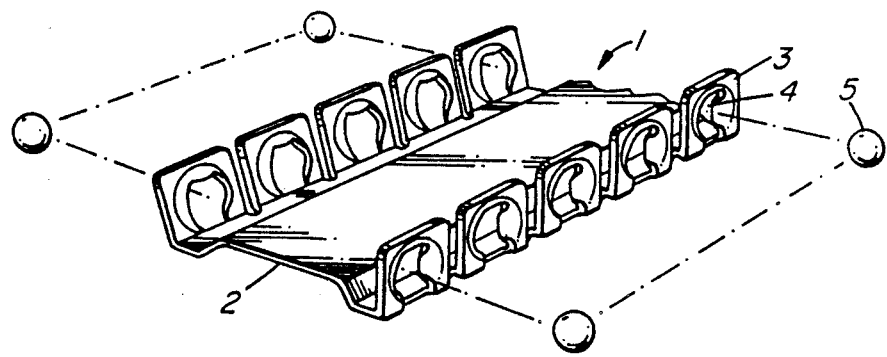
FIG. I
(PRIOR ART)
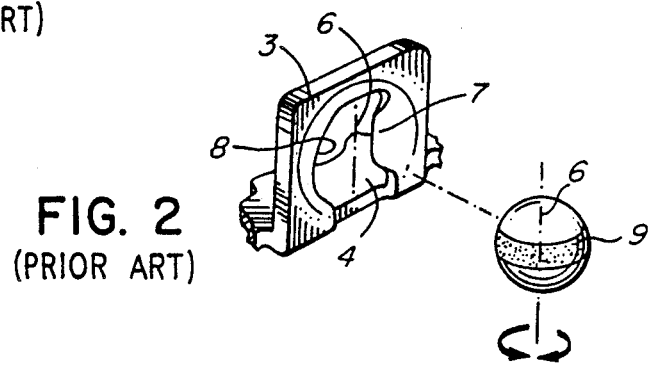
FIG. 2
(PRIOR ART)
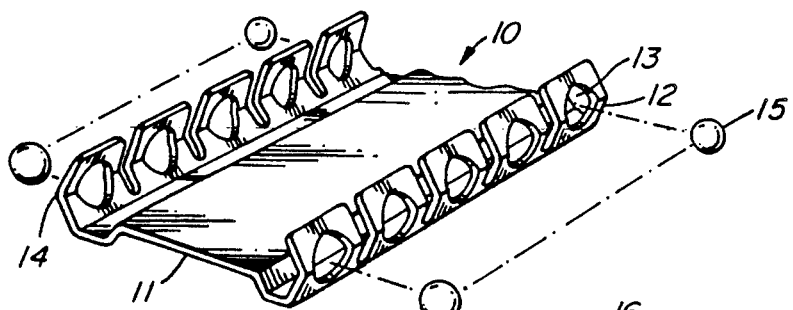
FIG. 3
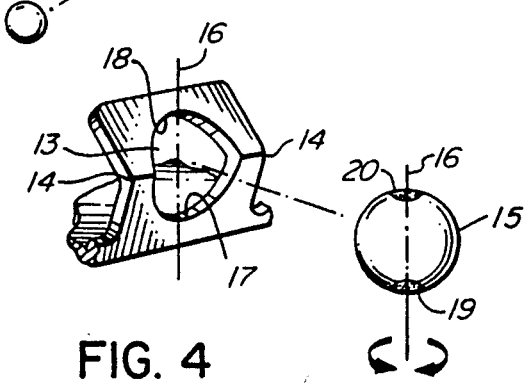
FIG. 4

BALL BEARING RETAINER FOR DRAWER SLIDES

FIELD OF THE INVENTION

This invention relates to drawer slides, more particularly two or three part channel drawer slides for file cabinets and the like. More particularly this invention relates to a new ball retainer for use with two or three part channel slides for use with common steel balls.

Drawer slides for filing cabinets and the like are subjected to very heavy loading and constant usage. As such, the importance of reducing friction and wear is paramount. Modern drawer slides generally use some type of bearing cage retainer which is used to retain balls which move along the raceways of an outer and inner slide channel.

BACKGROUND OF THE INVENTION

Modern drawer slides commonly in use today are of two basic types. The first type of drawer slide is one which uses two or three slides and after assembly the slide are not taken apart for installation into the cabinet. That is to say that the channel members are not designed to be separated from one another temporarily to be installed on drawers and cabinets. This first type of drawer slide can use an "open retainer" which can be manufactured from plastics or steel. An open retainer has seating apertures for the balls which have radii greater than that of the balls. After assembly the balls are prohibited from lateral displacement by the raceways of the mating flanges of an inner and outer slide channel member. The cage serves only to prohibit the balls from up and down and longitudinal displacement.

In the second type of drawer slide a retainer is used which has pressed and formed apertures which generally have a radius which is smaller than the radius of the ball. Such retainers after assembly secure the ball for rotation between the aperture and the inside portion of the flange of the outer channel. The inner channel flanges also contact portions of the balls when the slide is assembled but if the inner channel is removed the balls are maintained in place. This allows the file cabinet producer to affix the inner slide channel to the drawer and the outer slide channel to the cabinet during installation. Thereafter the slide channels are fitted back together and contact of the balls takes place on the adjacent raceways of the flanges of the outer and inner channels. It is this second type of modern drawer slide to which the present invention is directed.

In the second type of drawer slide the industry presently uses a generally standard bearing cage retainer which is made from a standard light guage piece of channel. Side flanges are folded upwards from the base and formed into a plurality of individual flanges on each side. An aperture is punched in each of the side flanges with the sides of the aperture pressed inwards to form a seat for the ball. The depressed pocket area formed is made in such a manner that the ball rests on the side edges of the aperture that is to say the points of contact are furthest away from the axis of rotation which is generally vertical running from the base of the retainer to the top of the flanges.

The inventor has found that such presently used retainers are not without problems. In particular there is a great amount of friction created at the points of contact between the apertures of the retainer and the balls. During normal slide travel the ball is supported on the friction surfaces. These points of contact occur on the portions of the ball with the highest surface velocity, consequently causing considerable resistance to rotation and promoting skidding of the ball along the slide channel raceways.

It is therefore an object of the present invention to provide a new ball retainer for use with two and three part drawer slides wherein friction between the ball and the retainer itself is significantly reduced.

It is also an object of this invention to provide a drawer slide of the second type (i.e. one in which the channels can be removed after assembly) has a significantly longer life span.

SUMMARY OF THE INVENTION

The present invention in its broadest form provides a retainer which has apertures which are elliptical in shape when viewed from the side. The apertures are formed such that when the ball is seated for rotation between the retainer apertures and the outer slide flange wall, the points of contact of the balls are at the top and bottom of the apertures close to or at the axis of rotation, when the drawer exhibits longitudinal movement. Thus the ball rotates about the vertical axis during retainer travel. Unlike the present devices, the balls do not contact the sides of the aperture where the greatest velocity of the ball occurs.

In a preferred embodiment the apertures are punched into the side flanges of the retainer in the form of round holes which have radii larger than the balls for which these are designed to retain. Thus in the first stage of production the balls are able to fall through the apertures. However in a second phase of production the upturned flanges are folded along the horizontal axis at the approximate mid-point of the aperture between the base and the top of the flange. Thus, an elliptical opening is formed having a vertical axis which is less than the horizontal axis. The ball lying in the pocket has friction points at the top and the base of the aperture. This is the area of lowest velocity during rotation of the balls, therefore providing the least resistance to ball rotation during movement of the drawer slide channels.

After the fold the retainer in cross-section has a flange which extends obliquely upwards and outwards from the base to the mid-point of the aperture and then obliquely upwards and inwards to the top of the flange.

Therefore this invention seeks to provide a ball-bearing retainer for use with drawer slides comprising a channel member consisting of a base and at least one upturned side flange, said side flange having at least one aperture; said aperture being elongated in the length of the channel and further dimensioned to engage and retain a common steel ball from longitudinal movement; and when in operation said aperture provides a seat for rotation of said steel ball about an axis which is transverse to the length of the channel member and at right angles to the base thereof, such that the regions of the ball most distanced from the axis of rotation do not contact said aperture.

BRIEF DESCRIPTION OF THE DRAWINGS

The invention is described in greater detail in conjunction with the following drawings wherein:

FIG. 1 is a perspective view of a prior art ball retainer;

FIG. 2 is an enlarged view of the pocket area of the retainer shown in FIG. 1;

FIG. 3 is a perspective view of a preferred embodiment of the present invention;

FIG. 4 is an enlarged view of the pocket area of the retainer shown in FIG. 3;

DETAILED DESCRIPTION OF THE INVENTION

Figure 5:
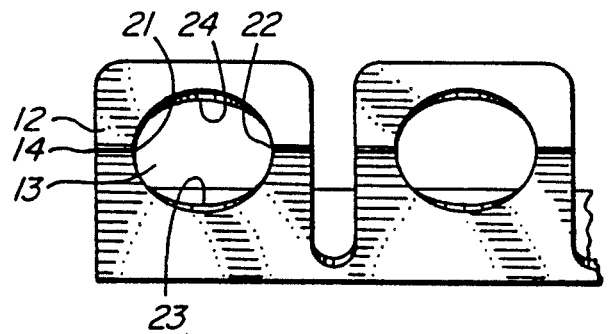
FIG. 5 is a face view of the pocket area after the side flanges have been folded.

In FIG. 1 one sees the prior art ball retainer known generally as (1). It has a base (2) and upwardly turned side flanges (3). Each of side flanges (3) has an aperture punched therein and is marked as (4). Each of the apertures are adapted to receive a ball (5).

In FIG. 2 one sees an enlarged view of the pocket area showing the flange (3) and the aperture (4). Balls rotate about a vertical axis shown in dotted lines as (6). The sides of the aperture (4) are slightly depressed inwardly. The ball rests in the depressed pocket area with its principal points of contact on the edges of the aperture basically shown as (7) and (8). When the ball turns about the vertical axis (6) during longitudinal movement of the slide a portion of the ball shown generally in a dotted area as (9) is the portion of the ball which comes in contact with the edges of the aperture (4) at points (7) and (8). This portion of the ball shown as (9) is that which is furthest removed from the vertical axis, and that which also has the greatest velocity during movement thereby causing considerable friction and resistance.

FIG. 3 shows an embodiment of the ball retainer of the present invention which is generally designated as (10). It has a base (11) and upturned side flanges (12). A round aperture (13) is punched in each of the side flanges (12). The side flanges are then folded about a horizontal axis (14) at the approximate mid-point of the aperture (13). The balls (15) are then adapted to be seated for rotation within the aperture (13) being retained between the flanges (12) and the inside of the side flange of an outer slide channel (not shown in FIG. 3).

FIG. 4 is an enlarged view of a side flange of the retainer shown in FIG. 3. As noted before, the side flanges are folded about a horizontal axis (14) thereby creating an elliptical aperture when viewed from the side. The axis of rotation for the ball (15) is shown in a broken line and numbered (16). After folding the flange the vertical diameter of the aperture is less than the horizontal diameter of the aperture and as such the points of contact of the ball (15) are at the base and the top of the aperture shown respectively as numbers (17) and (18) respectively. The contact portions of the ball (15) are shown generally as (19) and (20). These respectively come in contact with areas (17) and (18) of the aperture's sides. It is to be noted that such points are nearest the vertical axis of rotation and as such they are the areas of lowest velocity during rotation of the ball. By having these portions of the ball come in contact the amount of friction during rotational movement is minimized, therefore resulting in less wear.

FIG. 5 is a fragmentary side elevation of the upturned side flanges (12) of the retainer generally known as (10). The flanges are viewed after they have been folded along horizontal axes (14). After the folding has occurred, the aperture (13) appears elliptical. One notes that the diameter of the aperture between points (21) and (22) on the horizontal axis is considerably larger than the diameter between points (23) and (24) on the vertical axis. Hypothetically, in a perfect world, points (23) and (24) would represent the points of contact with the ball (15) (not shown in FIG. 5).

Figure 6:
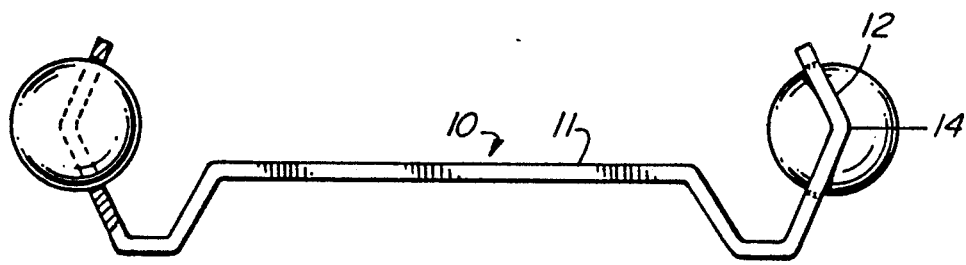
FIG. 6 is an end view of a preferred embodiment of the retainer of the present invention and FIG. 7 is an end view of the right side of a three part drawer slide with the retainers of the present invention in place.

FIG. 6 is an end view of a preferred embodiment of the retainer (10) of the present invention. It has a base (11) and side flanges (12) which are folded along the horizontal axes (14).

Figure 7:
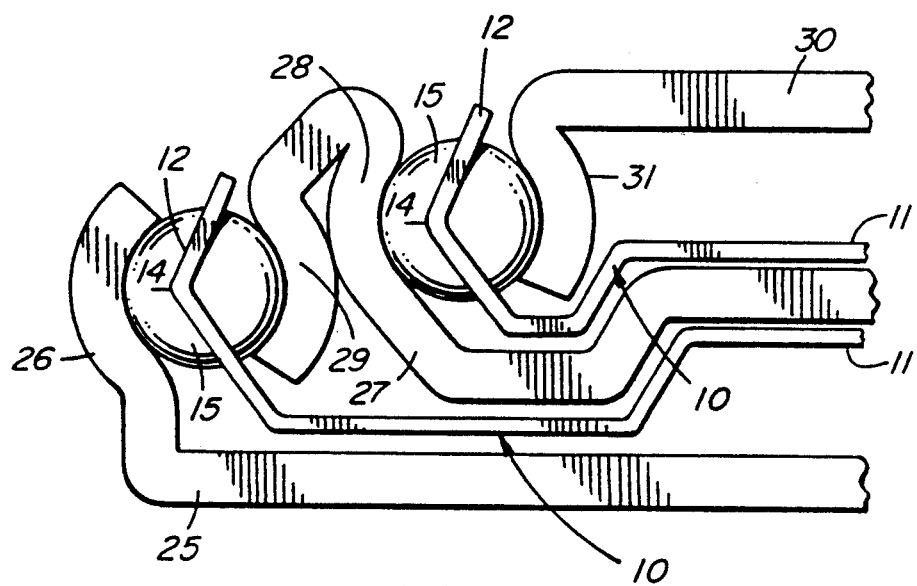

In FIG. 7 one sees the end view of the left side of a three part slide employing ball retainers which are the subject of the present invention. There is an outer channel slide (25) having a curvilinear upturned flange (26). A retainer (10) has a base (11) and an upturned side flange (12) which fits within the outer channel slide flange. Balls (15) are placed within the apertures of the retainer and seated between the flange (12) and the inside of the outer slide channel curvilinear outside flange (26). An intermediate channel slide (27) has both an upturned side flange (28) and a downwardly extending flange (29). Within the intermediate slide is a second retainer (10) having a base (11) and upturned side flange (12). An inner slide channel (30) having a downturned flange (31) fits over the second retainer (10). A ball (15) is seated between upturned flange (12) and the inner side of the upturned flange (28) of the intermediate channel slide (27). The balls are seated between both the intermediate slide channel (27) and the outer slide channel (25), and the intermediate slide channel (27) and the inner slide channel (30). The balls also contact the raceways formed by flanges (29) and (31) respectively.

In operation of the drawer slides, the balls (15) turn about the vertical axes (16) having contact points (17) and (18) of aperture (13). The horizontal circumference of the ball during rotation contacts only the slide channel flange raceways. The configuration of the retainers of the present invention greatly decreases wear and increases life of the balls, the retainers, and the channel slide members.

It is also to be noted that the present invention is not restricted to the embodiments herein but extends to any variation thereof which falls within the spirit of the present invention.

What I claim as my invention is:

1. A ball-bearing retainer for use with drawer slides comprising a channel member consisting of a base and at least one upturned side flange, said side flange having at least one aperture; said aperture being elongated in the length of the channel and further dimensioned to engage and retain a common steel ball, from longitudinal movement; and when in operation said aperture provides a seat for rotation of said steel ball about an axis which is transverse to the length of the channel member and at right angles to the base thereof, such that the regions of the ball most distanced from the axis of rotation do not contact said aperture.

2. A ball-bearing retainer as claimed in claim 1 wherein said retainer is adapted to fit between the flanges of two adjacent channel slides and said side flanges of said retainer comprise a plurality of apertures; a plurality of balls are adapted to be retained between said apertures and the inner side of the flanges of the outer most channel slide; said balls also being adapted to contact the outer side of the flange of the inner channel, whereby in operation said balls have points of rotation in contact with the base and top of said apertures.

3. A ball-bearing retainer as claimed in claim 2 wherein said retainer has a plurality of upturned side flanges on both sides of said base, each of said flanges having a round aperture therein; said apertures having a greater radius than said balls; wherein said flanges are bent at the approximate mid-point between the base of the aperture and the top of the aperture such that the straight line distance between the top of the aperture and the base of the aperture is less than the diameter of said ball; and during operative movement of the channel slides in relation to one another points of contact of said apertures with said balls occur near or at the axis of rotation of said balls.

4. A retainer as claimed in claim 3 wherein said side flanges extend upwardly and obliquely outwardly to the approximate mid-point of said aperture and then upwardly and obliquely inwardly to the top of said side flange; wherein said balls are adapted to be seated for rotation is said apertures between the outside of said side flange and the inside of the flange of the said outer channel slide; said balls also partially protruding through said apertures of said side flanges thereby contacting the outside of the flange of an inner channel slide.

* * * * *